J. H. WAGENHORST.
VEHICLE WHEEL.
APPLICATION FILED JUNE 10, 1912.

1,160,223.

Patented Nov. 16, 1915.
2 SHEETS—SHEET 1.

Witnesses:
Donn Twitchell
Edmund Quincy Moses

Inventor
James H. Wagenhorst
By his Attorney
Seward Davis

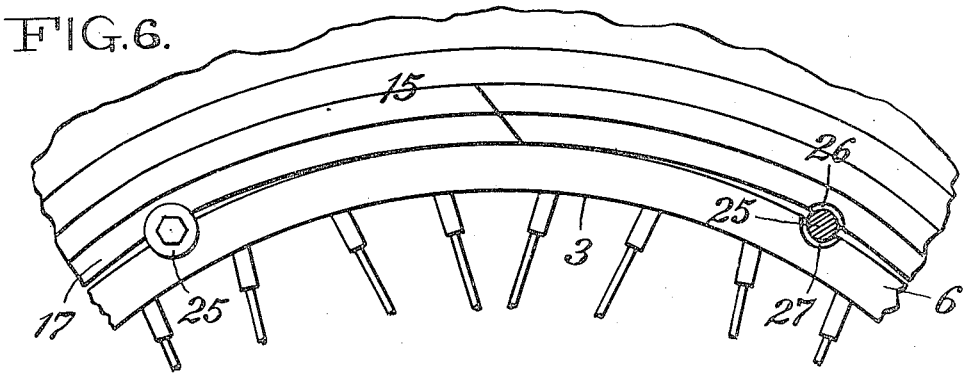
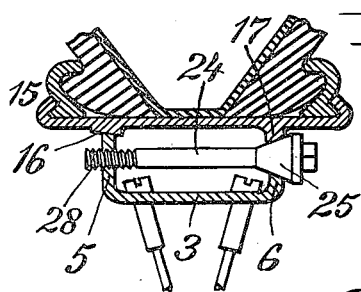
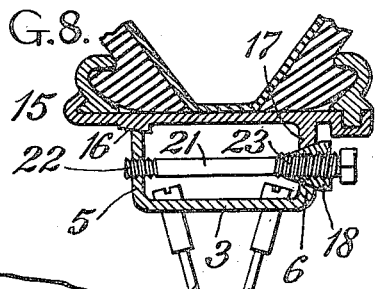
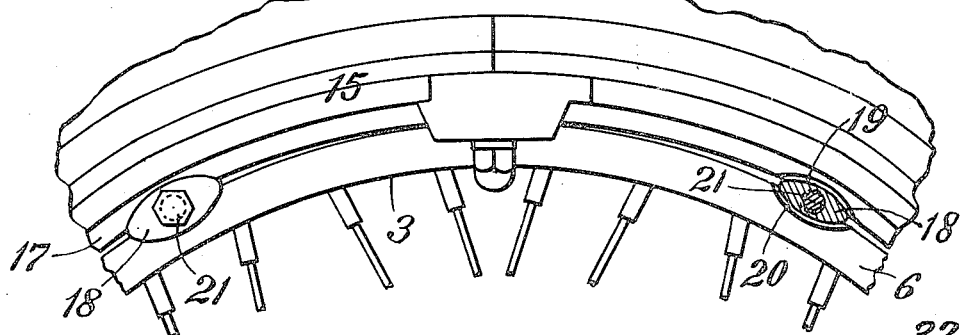
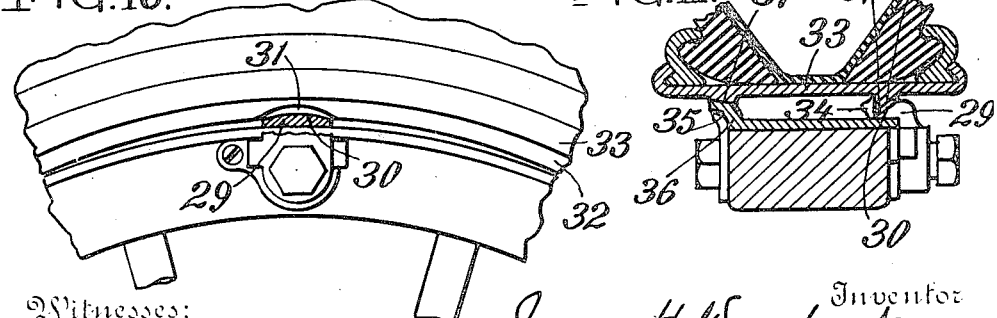

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL.

1,160,223.
Specification of Letters Patent.
Patented Nov. 16, 1915.

Application filed June 10, 1912. Serial No. 702,853.

*To all whom it may concern:*

Be it known that I, JAMES H. WAGENHORST, a citizen of the United States, residing in Akron, county of Summit, and State of Ohio, have invented certain new and useful Improvements in Vehicle-Wheels, of which the following is a specification.

This invention relates to improvements in means for removably securing a rim adapted to carry a pneumatic or other resilient tire upon a vehicle wheel. Such structures are commonly known as demountable rims.

My invention also comprises certain improvements in wire wheel structure.

Figure 1:
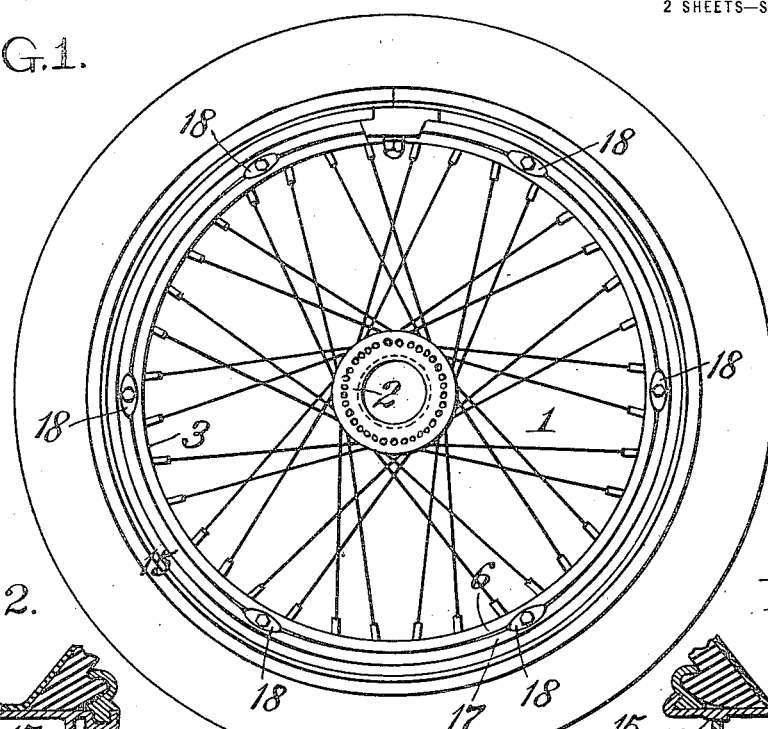
Figure 2:
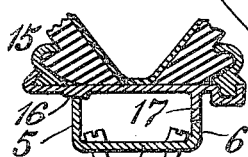
Figure 3:
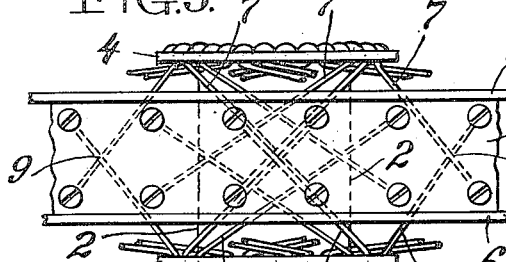
Figure 4:
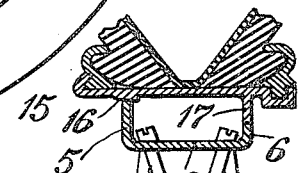
Figure 5:
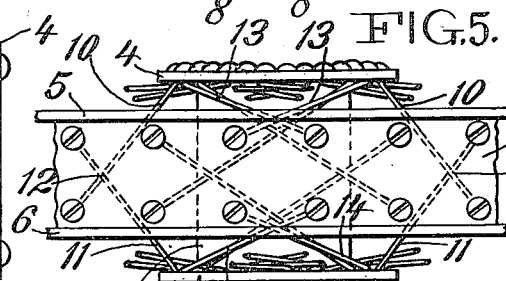

In the accompanying drawings which form a part of this specification, Figure 1 is a side elevation of a vehicle wheel, embodying one form of my invention. Fig. 2 is a transverse section through the hub and one side of the fixed rim and detachable rim of the wheel, showing a wheel having all its spokes transversely crossed. Fig. 3 is a diagrammatic plan view of the hub, some of the spokes, and a portion of the fixed rim of the wheel shown in Fig. 2, the tire-carrying rim and tire being removed. Fig. 4 is a view similar to Fig. 2, showing a modification of my improved wheel in which only a part of the spokes are transversely crossed. Fig. 5 is a view similar to Fig. 3 of the wheel shown in Fig. 4. Fig. 6 is a side elevation of a portion of fixed and detachable rims, showing one form of my improvement in demountable rim structures, one of the locking bolts or wedges being shown in section. Fig. 7 is a transverse section through the fixed and detachable rims shown in Fig. 6. Fig. 8 is a view similar to Fig. 7 showing another form of my demountable rim structure. Fig. 9 is a view similar to Fig. 6 of the form of my invention illustrated in Fig. 8. Figs. 8 and 9 show the same modification of my invention illustrated in Fig. 1, but in greater detail. Figs. 10 and 11 are a side elevation (part of the locking wedge being broken away) and a transverse section of a portion of fixed and detachable rims illustrating a modified form of demountable rim structure.

Referring to the drawings in detail, the numeral 1 designates a vehicle wheel having a hub 2 and a fixed rim 3. The hub and fixed rim may be of any suitable construction adapted to receive wire spokes. For example, the hub may be provided with the perforated flanges 4, while the fixed rim 3 may be in the form of a rolled metal channel, having the outwardly extending flanges or legs 5 and 6. In the form of my invention illustrated in Figs. 2 and 3, the wheel is provided with a series of spokes 7, all of which extend from the flange 4 at the left-hand side of the hub 2, across the width of the wheel to the opposite side of the channel 3, where they are attached at the bottom of the channel as near to the flange 6 as is practicable. A second series of spokes 8 extend from the flange 4 at the right-hand side of the hub 2 diagonally across the width of the wheel to the side of the channel 3 near the flange 5. It will thus be seen that these spokes 7 and 8 cross the medial plane of the wheel at the point 9 as indicated in Figs. 2 and 3.

It has heretofore been the practice, so far as I am aware, to arrange the spokes in wire wheels in two series, separated transversely, the spokes of one series passing from a flange or other connecting means at one side of the hub to the corresponding side of the fixed rim, the spokes of the second series similarly connecting the opposite corresponding sides of the hub and fixed rim. As will be readily understood, the spokes arranged in this manner will be much more nearly parallel than spokes arranged to cross transversely as illustrated in Fig. 2. The more nearly parallel the spokes the less able are they to resist the lateral stresses to which the wheel is subjected, such stresses being those most destructive to wire wheels and which it has hitherto been found most difficult to care for. It will be seen that by crossing the spokes as shown, I get the maximum possible inclination of the spokes for any given width of fixed rim and hub, and am thus enabled to obtain a rigid wheel without the necessity of unduly elongating the hub.

In Figs. 4 and 5 I have shown a modification of my wire wheel construction in which the spokes are arranged in four series, some of the spokes extending from each side of the hub to the corresponding side of the fixed rim as in the usual wire wheel construction, while other spokes cross transversely from one side of the hub to the opposite side of the fixed rim as is the case with the spokes 7 and 8 shown in Fig. 2. Thus it will be seen that the spokes 10 extend from the flange 4 at the left-hand side of the hub 2, to the right-hand side of the fixed rim 3 near the flange 6 thereof, and the corresponding spokes 11 extend from the flange 4 at the right-hand side of the hub, cross the spokes 10 in the medial plane of the wheel as indicated at 12, and are connected to the fixed rim 3 near the flange 5 thereof. Other spokes, 13 and 14, extend from the flanges of the hub to the corresponding sides of the fixed rim. By this arrangement it will be seen that a very rigid wheel structure is obtained, as the spokes, hub and fixed rim form triangular trusses adapted to resist lateral flexure of the wheel in the most efficient manner possible. Thus it will be seen that the spokes 10, 13, and the bottom of the fixed rim 3 form one triangle, spokes 11, 14 and the fixed rim form a second triangle, spokes 11, 13, and the hub 2 form a third triangle, and spokes 10, 14 and the hub form a fourth triangle.

My improvements in demountable rims are well adapted for use with wire wheels, and particularly with my improved form of wire wheel above described, although they are not limited to such use and may be adapted to other forms of wheels, whether wire, wooden, or of tubular metallic construction. In accordance with my invention, the fixed rim is provided at each side with a bearing surface, these surfaces being formed by the edges of the flanges 5 and 6 of the channel 3, where the fixed rim comprises such a channel as illustrated in Figs. 1 to 9 inclusive. The flanges 5 and 6 are preferably made of differetn heights as indicated, the edges of these flanges which form the bearing surfaces being slightly beveled in the direction of the lower flange. The tire is carried by the removable rim 15 which may be of any suitable construction, and which is provided with the bearing surface 16 adapted to engage the edge of the higher flange 5 of the fixed rim, the rim being provided with an inwardly projecting flange 17, the edge of which forms a bearing surface adapted to engage the edge of the lower flange 6 of the fixed rim. By making the flanges 5 and 6 of different heights, it will be seen that bearing surfaces for the rim at opposite sides of the fixed rim, of different diameters, are provided. Such arrangement greatly facilitates the application and removal of the removable rim and tire. A very slight lateral movement of the rim upon the wheel frees the rim from the wheel to an extent sufficient to permit it to be very readily removed therefrom without interference from the valve stem. As will be understood, the valve stem projects inward through a hole in the rim and a corresponding hole through the fixed rim, so that the rim cannot be entirely removed laterally from the wheel, but must be withdrawn from the wheel first at the side diametrically opposite to the valve stem, after which the rim can be lifted to draw the valve stem out of the hole through the fixed rim. With the rim supported upon bearing surfaces of different diameters at the sides of the fixed rim, such tipping is very easily accomplished, the amount of clearance to permit such tipping being almost negligible. If the bearing surfaces were of the same diameter, several times the clearance would be necessary to permit the rim to be tipped and the valve stem withdrawn as described.

For securing the tire-carrying rim to the wheel, I use a series of wedges of novel construction, adapted to be inserted between the wheel and tire-carrying rim, these wedges preferably not only acting directly to retain the rim against lateral removal from the wheel, but also acting to force the rim away from the wheel at intervals, thus distorting it slightly and causing it to clamp the bearing surfaces of the fixed rim between adjacent wedges. Such action is illustrated in Figs. 1, 6 and 9. As shown in Figs. 1, 8 and 9, the locking means comprise a plurality of conical wedges 18 of elliptical cross-section, which are adapted to be forced laterally between properly shaped seats 19 formed in the flange 17 of the rim, and 20 formed in the flange 6 of the fixed rim. The wedges are preferably drawn between the seats on the rim and fixed rim by means of bolts 21 as shown in Fig. 8. Each bolt 21 is provided with a right-hand threaded portion 22, screwing through an opening in the flange 5 of the fixed rim, and with a left-hand threaded portion 23 of greater diameter than the threaded portion 22, this threaded portion 23 screwing through a similarly threaded opening in the wedge 18. By screwing up the bolt 21 it will be seen that a double movement will be imparted to the wedge, so that it may be quickly moved to operative or inoperative position. The elliptical section of the wedges 18 prevents their rotation with the bolts 21 when the latter are turned to move the wedges in or out.

Figs. 6 and 7 show a modification of my invention in which the wedges and their attached bolts are formed integral. As shown in these figures bolts 24 are used, having integral conical heads 25 of circular section, these heads constituting the wedges which engage the correspondingly shaped bearing surfaces 26 and 27 on the detachable and fixed rims respectively. The bolt 24 has a screw-threaded end 28 which screws through an opening in the flange of the fixed rim. The heads 25 being of circular section, they do not prevent the free rotation of the bolts 24.

In Figs. 10 and 11 I have shown a modified rim structure in which the tire-carying rim is wedged upon a wheel by means of a series of wedges 29, only one of which is shown. The wedges 29 have curved outer wedging faces, as indicated at 30 in Fig. 10, these curved faces engaging correspondingly shaped seats 31 formed in the flange 32 of the tire-carrying rim 33. In accordance with my improved structure illustrated in these figures, the seats 31 for the wedges 29 are formed by bending in portions of the flange 32 as indicated at 34. The side surface of the turned in portion of the flange forms a seat 31 of the proper shape to be engaged by the wedge 29. The convex shape of the wedges and the corresponding concave shape of the seats 31 permit the wedges 29 to act as driving lugs and prevent creeping of the rim upon the wheel. The portions of the flange 32 between adjacent wedges 29 are intended to be drawn into contact with the surface of the wheel periphery and thus clamp the rim upon the wheel and give the rim proper support throughout the greater part of its circumference. At the opposite side of the wheel periphery a bearing surface 35 is provided upon a raised flange 36, this bearing surface being engaged by a complementary bearing surface 37 formed on the under side of the rim.

It will be understood that the wedges shown in Figs. 6, 7, 8 and 9, engaging the concave seats formed in the flanges on the fixed and detachable rims, effectually lock the rim against circumferential movement upon the fixed rim, and thus render unnecessary the use of driving lugs for that purpose. Adjustable wedges of this nature are much more effective for preventing creeping than fixed driving plates, as they may be drawn up tight so as to prevent even the slightest circumferential movement and thus eliminate wear from this cause. With fixed driving plates some play is inevitable.

Having thus described certain preferred embodiments of my invention, but without desiring to limit myself to the details shown and described any further than as specified in certain of the more limited claims hereunto appended, I claim—

1. The combination with a vehicle wheel of a fixed rim having flanges of different heights at the edges of the periphery thereof, of a demountable tire-carrying rim having a bearing surface adapted to engage the edge of the higher flange of the fixed rim, and having an inwardly projecting flange, the edge of which is adapted to engage the edge of the lower flange of the fixed rim, and means for forcing said demountable rim out of contact with said fixed rim at one point, and for causing it to clamp said fixed rim elsewhere about its circumference, comprising a wedge adapted to be inserted between the said last named flanges, and means for forcing said wedge between said flanges and retaining it in position.

2. The combination with a vehicle wheel of a fixed rim having flanges of different heights at the edges of the periphery thereof, of a demountable tire-carrying rim having a bearing surface engaging the higher of said flanges, said demountable rim having an inwardly projecting flange engaging the lower of said flanges, the bearing surfaces of said last named pair of flanges being provided at intervals with complementary recesses and wedges adapted to be inserted laterally in said complementary recesses and said wedges being adapted to lift said demountable rim away from said fixed rim at their points of contact and to cause said demountable rim to clamp said fixed rim between such points, and means for operating said wedges and retaining them in position.

3. The combination in a vehicle wheel of a fixed rim comprising a U-shaped channel having flanges of different heights at the edges of the periphery thereof, of a demountable tire-carrying rim having a bearing surface engaging the higher of said flanges and having an inwardly projecting flange engaging the lower of said flanges, the edges of said engaging flanges being provided with complementary recesses having beveled walls, a conical wedge of non-circular cross-section adapted to be inserted in said complementary recesses, and a bolt passing axially through said wedge and screwing through an opening in the higher flange of said wheel.

4. The combination with a vehicle wheel having flanges of different heights at the edges of the periphery thereof, of a tire-carrying rim having a bearing surface engaging the higher of said flanges, and having an inwardly projecting flange engaging the lower of said flanges, the inwardly projecting flange on said rim having a semi-elliptical notch formed in the edge thereof, a complementary semi-elliptical notch being formed in the edge of the lower flange of said wheel, the walls of said complementary notches being convergently beveled, a conical wedge of elliptical cross-section inserted in said semi-elliptical notches, said wedge having an internally threaded axial opening therethrough and a bolt passing through said opening and having a screw-threaded portion engaging with the same, said bolt having a second screw-threded portion screwing through an opening in the higher flange of said wheel, the two threaded portions of said bolt having opposite pitches.

5. The combination with a vehicle wheel having flanges of different heights at the edges of the periphery thereof, of a tire-carrying rim having a bearing surface engaging the higher of said flanges, and having an inwardly projecting flange engaging the lower of said flanges, said flanges being provided with complementary notches, a wedge inserted in said notches, having an internally threaded axial opening therethrough, and a bolt passing through said opening and having a screw-threaded portion engaging with the same, said bolt having a second screw-threaded portion screwing through an opening in the higher flange of said wheel, the two threaded portions of said bolt having opposite pitches.

6. The combination with a vehicle wheel having flanges of different heights at the edges of the periphery thereof, of a tire-carrying rim having a bearing surface engaging the higher of said flanges, and having an inwardly projecting flange engaging the lower of said flanges, said flanges being provided with complementary notches, a wedge of non-circular cross-section inserted in said notches, said wedge having an internally threaded axial opening therethrough and a bolt passing through said opening, and having a screw-threaded portion engaging with the same, said bolt having a second screw-threaded portion screwing through an opening in the higher flange of said wheel, the two threaded portions of said bolt having opposite pitches.

7. The combination with a vehicle wheel having flanges of different heights at the edges of the periphery thereof, of a tire-carrying rim having a bearing surface engaging the higher of said flanges, and having an inwardly projecting flange engaging the lower of said flanges, said flanges being provided with complementary notches, a conical wedge of elliptical cross-section inserted in said notches, said wedge having an internally-threaded axial opening therethrough, and a bolt passing through said opening, and having a screw-threaded portion engaging with the same, said bolt having a second screw-threaded portion screwing through an opening in the higher flange of said wheel, the two threaded portions of said bolt having opposite pitches.

8. The combination with a vehicle wheel of a fixed rim having flanges of different heights at the edges of the periphery thereof, of a demountable tire-carrying rim having a bearing surface adapted to engage the edge of the higher flange of the fixed rim and having an inwardly projecting flange, the edge of which is adapted to engage the edge of the lower flange of the fixed rim, of means for forcing said demountable rim out of contact with said fixed rim at a plurality of points and for causing it to clamp said fixed rim elsewhere about its circumference comprising a plurality of wedges adapted to be inserted between said last-named flanges, and means for forcing said wedges between said flanges and retaining them in position.

9. The combination with a vehicle wheel of a fixed rim having flanges of different heights at the edges of the periphery thereof, of a demountable tire-carrying rim having a bearing surface adapted to engage one of the flanges, and an inwardly projecting flange, the edge of which is adapted to engage the edge of the other flange of the fixed rim, and a wedge seated between the flange of the fixed rim and the flange of the demountable rim for locking the latter upon the wheel, said wedge being mounted upon a bolt member passing therethrough and into the wall of the opposite flange.

JAMES H. WAGENHORST.

Witnesses:
SEWARD DAVIS,
EDMUND QUINCY MOSES.